US010712021B2

(12) United States Patent
Smith (10) Patent No.: US 10,712,021 B2
(45) Date of Patent: Jul. 14, 2020

(54) PULSE MODULATED HEATING, VENTILATION, AND AIR CONDITIONING (HVAC) CONTROL (71) Applicant: Computime, Ltd., Queensway (HK)

(72) Inventor: Philip John Smith, Guangdong (CN)

(73) Assignee: Computime Ltd., New Territories (HK)

( * ) Notice: Subject to any disclaimer, the term of this patent is extended or adjusted under 35 U.S.C. 154(b) by 114 days.

(21) Appl. No.: 16/020,180

(22) Filed: Jun. 27, 2018

(65) Prior Publication Data
US 2020/0003431 A1      Jan. 2, 2020

(51) Int. Cl.
*F24D 19/10* (2006.01)
*F24D 3/02* (2006.01)
(Continued)

(52) U.S. Cl.
CPC ........... *F24D 19/1009* (2013.01); *F24D 3/02* (2013.01); *F24D 3/14* (2013.01); *G05B 11/28* (2013.01);
(Continued)

(58) Field of Classification Search
CPC .......... F24D 19/1009; F24D 3/02; F24D 3/14; F24D 2220/0271; F24D 2220/0292;
(Continued)

(56) References Cited

U.S. PATENT DOCUMENTS

| 4,941,326 A * | 7/1990 | Sumi .................. F24F 11/30 62/180 |
| 8,220,722 B1 * | 7/2012 | Shaffer .................. E03C 1/05 137/624.22 |

(Continued)

FOREIGN PATENT DOCUMENTS

| DE | 3708449 A1 * | 9/1988 | ......... G05D 23/1913 |
| DE | 102010053209 A1 | 6/2012 | |

(Continued)

OTHER PUBLICATIONS

Feb. 12, 2020—(EP) Extended European Search Report—Appln No. 19182422.6.

*Primary Examiner* — Thomas C Lee
*Assistant Examiner* — Michael Tang
(74) *Attorney, Agent, or Firm* — Banner & Witcoff, Ltd.

(57) ABSTRACT

An underfloor heating (UFH) system limits the floor temperature of an environmental entity (for example, a room) by pulsing (pulse modulating) the flow rate through a hydronic emitter (circuit) heating the environmental entity. Once the heated water fills the circuit during time interval $T_{on}$, the flow is stopped for a fixed time $T_{off}$ before allowing the cycle to repeat until a target temperature is reached. The ratio of flow/no flow ($T_{on}/T_{off}$) may be a proportional lower floor temperature compared to a traditional circuit supporting a constant water flow. The UFH system may heat a plurality of rooms, each having different floor temperature limitations. The floor temperatures may be limited differently by pulsing the hydronic emitters (circuits) rooms differently.

19 Claims, 11 Drawing Sheets (51) Int. Cl.
*F24D 3/14* (2006.01)
*G05B 11/28* (2006.01)
*G05B 11/42* (2006.01)
*G05D 23/19* (2006.01)

(52) U.S. Cl.
CPC ......... *G05B 11/42* (2013.01); *G05D 23/1917* (2013.01); *G05D 23/1919* (2013.01); *G05D 23/1934* (2013.01); *F24D 2220/0271* (2013.01); *F24D 2220/0292* (2013.01)

(58) Field of Classification Search
CPC ........... G05D 23/1919; G05D 23/1917; G05D 23/1934; G05B 11/42; G05B 11/28
See application file for complete search history.

(56) References Cited

U.S. PATENT DOCUMENTS

| | | | | |
|---|---|---|---|---|
| 2002/0088867 A1* | 7/2002 | Neve | ................ | G05D 23/1931 237/69 |
| 2003/0182021 A1* | 9/2003 | Kidder | ............... | G05D 23/1934 700/277 |
| 2006/0065754 A1* | 3/2006 | Joergensen | ......... | F24D 19/1015 236/49.3 |
| 2009/0048719 A1* | 2/2009 | McLaughlin | ....... | F24D 19/1009 700/299 |
| 2013/0220590 A1 | 8/2013 | Lang et al. | | |
| 2014/0348524 A1* | 11/2014 | Shimizu | ............... | H05B 1/0241 399/45 |
| 2015/0122475 A1* | 5/2015 | Baasch Sorensen | ... | F28F 27/02 165/287 |
| 2015/0144323 A1* | 5/2015 | Cho | ........................ | F24F 3/044 165/287 |
| 2019/0242592 A1* | 8/2019 | Adamek | ................ | H04L 12/00 |

FOREIGN PATENT DOCUMENTS

| | | |
|---|---|---|
| EP | 2615516 A1 | 7/2013 |
| EP | 2653789 A2 | 10/2013 |
| JP | 2004360509 A * | 12/2004 |
| JP | 2007301192 A * | 11/2007 |
| WO | 2010095092 A2 | 8/2010 |

* cited by examiner

PULSE MODULATED HEATING, VENTILATION, AND AIR CONDITIONING (HVAC) CONTROL

TECHNICAL FIELD

Aspects of the disclosure relate to power modulating individual radiators, underfloor heating circuits, chilled beams or fan-coils for a heating/cooling system.

BACKGROUND OF THE INVENTION

Traditional heating/cooling systems with hydronic emitters (including radiators, underfloor heating/cooling circuits, fan coils, chilled beams) often require substantial time (for example, six or more hours) to raise the room temperature even a few degrees C. One reason is that the flow temperature in underfloor heating (UFH) systems is typically quite low at around an average of 35 degrees C., and the flow rate is restricted to achieve a total circuit balance. The result is that the room cannot be placed in setback overnight. Consequently, in accordance with traditional approaches, a UFH system maintains a constant temperature in the room, for example 20-21 degrees C., because if the room were allowed to be lowered overnight the time taken for the room to get back to 20-21 degrees C. would take too long. In addition, various floor materials may have a maximum floor temperature that cannot be exceeded.

SUMMARY OF THE INVENTION

An aspect supports an underfloor heating (UFH) system that limits the floor temperature of an environmental entity (for example, a room) by pulsing (pulse modulating) the flow rate through a hydronic emitter (circuit) heating the environmental entity. Once the heated water fills the circuit, the flow is stopped for a fixed time before repeating the cycle. The ratio of flow/no flow (On/Off) may be a proportional lower floor temperature compared to a traditional circuit supporting a constant water flow. The net result is typically a lower floor temperature for the circuit that is pulsed on/off as opposed to a circuit that had a constant flow.

With another aspect, a UFH system may heat a plurality of rooms, each having different floor temperature limitations. The floor temperatures may be limited differently by pulsing the hydronic emitters (circuits) rooms differently.

With another aspect, a controller assembly adjusts the water flow through a hydronic emitter so that the room temperature approximately equals a targeted heating temperature without the floor temperature exceeding a maximum floor temperature. When the controller assembly receives a temperature set point and measured room temperature from an associated thermostat, the controller assembly adjusts the water flow so that the hydronic emitter fills with heated water. Once the controller assembly determines that the hydronic emitter is filled, the controller assembly causes a valve to close thus stopping the water flow during a determined time interval. Because water flow is turned on and then turned off during a cycle, water flow is pulsed. After one or more pulsing cycles, the controller assembly repeats the above actions based on the updated room temperature obtained from the associated thermostat. The controller assembly modulates (pulses) the water flow through the hydronic emitter until the room temperature reaches a targeted heating temperature.

With another aspect, a controller assembly detects when a hydronic emitter has filled with heated water when the measured outlet temperature sufficiently increases.

With another aspect, a controller assembly determines a ratio $T_{on}/T_{off}$ from the maximum floor temperature. A hydronic emitter fills with heated water during $T_{on}$ while water flow is shut off during $T_{off}$.

With another aspect, a manifold/valve heating/cooling system supports both a heating mode and a cooling mode. When in the heating mode, a controller assembly causes a hydronic emitter to fill with heated water and subsequently shuts off the water flow over a pulsing cycle. This is done in a repetitive manner until the targeted heating temperature is reached. When in the cooling mode, the controller assembly causes cooled water to flow through the hydronic emitter until the targeted cooling temperature is reached. The controller assembly then turns off the water flow.

With another aspect, a controller assembly supports a calibration mode, where a pulse ratio is determined from temperature measurements of a floor provided by a temperature sensor typically located on the floor. The controller assembly operates in an operational mode after completing calibration.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

According to traditional approaches, the temperature of water flowing through an underfloor heating (UFH) system is quite low at around at average of 35 degrees C. The flow rate is typically restricted to achieve a total circuit balance, and the result is that a room cannot be placed in setback overnight. A traditional UFH system is typically controlled to a temperature between 20-21 degrees C. because if the room were allowed to be lowered overnight the time to restore the room temperature would be excessive.

To address the above deficiencies, the temperature of water flowing through a UFH system is increased with respect to traditional approaches. According to an aspect of the embodiments, an underfloor heating system limits the floor temperature of an environmental entity (for example, a room) by pulsing (pulse modulating) the flow rate through a hydronic emitter (circuit) heating the environmental entity. Without limiting the floor temperature, an occupant may experience discomfort when bare footed on a bathroom tiled floor and/or damage may occur with some types of floors. A room that requires a lower floor temperature may have its associated circuit filled with heated water. Once the heated water fills the circuit, the flow is stopped for a fixed time before allowing the cycle to repeat. The ratio of flow/no flow ($T_{on}/T_{off}$) may be a proportional lower floor temperature compared to a traditional circuit supporting a constant water flow. The net result is typically a lower floor temperature for the circuit that is pulsed on/off as opposed to a circuit that has a constant flow. Moreover, according to an aspect of the embodiments, a UFH system may heat a plurality of rooms, each having different floor temperature limitations. In such situations, the floor temperatures may be limited differently by pulsing the hydronic emitters (circuits) rooms differently.

Figure 1:
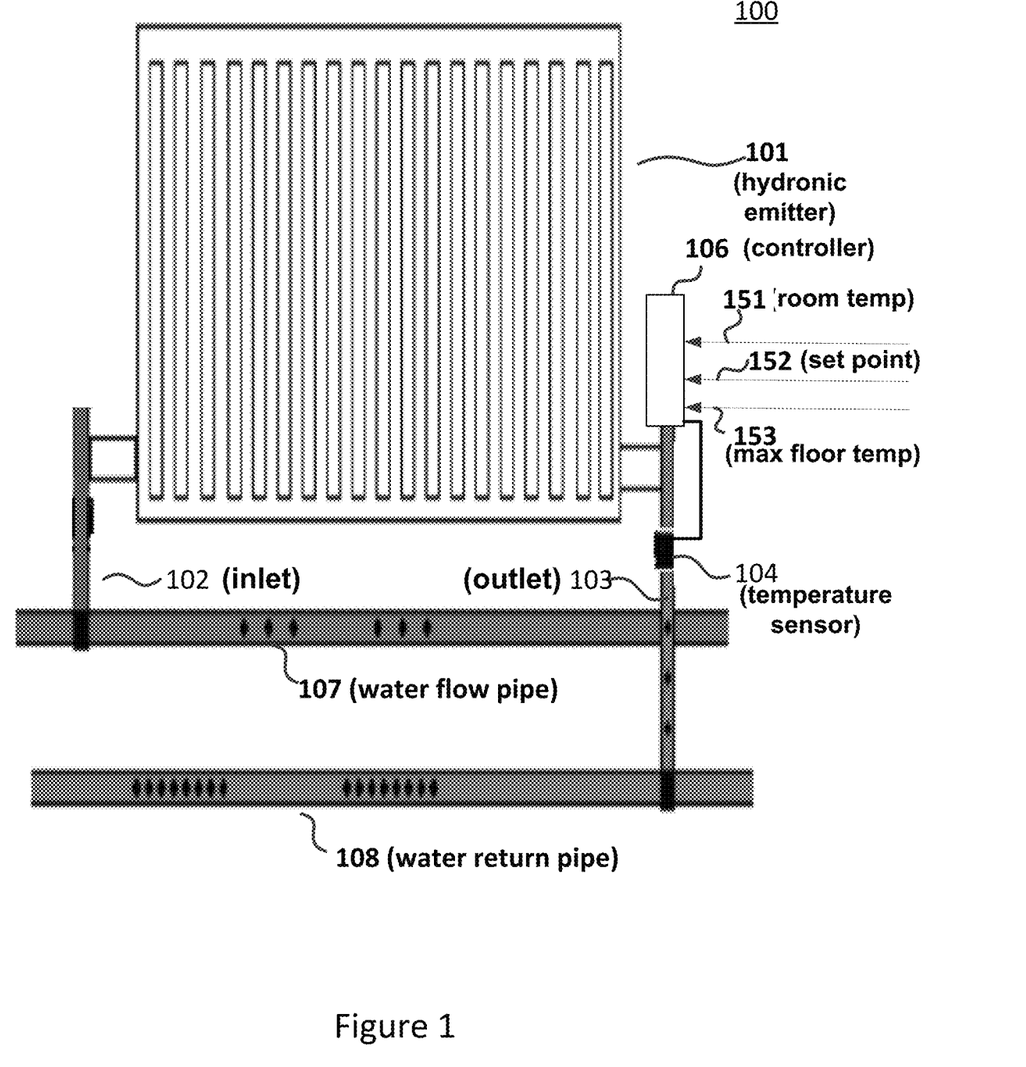
FIG. 1 shows a hydronic emitter in accordance with an embodiment.

FIG. 1 shows hydronic emitter 101 in accordance with an embodiment. Hydronic emitter 101 may comprise one or more radiators, underfloor heating/cooling circuits, fan coils, and/or chilled beams. As will be further discussed, controller assembly 106 controls water flow through hydronic emitter 101 via a valve not explicitly shown.

Controller assembly 106 may support heating and/or cooling environmental systems. When supporting a heating mode, water flow pipe 107 transports heated water to hydronic emitter 101 through inlet 102. When supporting a cooling mode, water flow 107 transports cooled water. Water return pipe 108 returns the expended water from hydronic emitter 101 through outlet 103.

During the heating mode, controller assembly 106 adjusts the water flow through hydronic emitter 101 so that room temperature 151 approximately equals a targeted heating temperature (for example, set point 152 or the set point plus an offset) without the floor temperature exceeding maximum floor temperature 153. For example, when controller assembly 106 receives temperature set point 152 and room temperature 151 from an associated thermostat, controller assembly 106 adjusts the water flow though hydronic emitter 101 so that the hydronic emitter 101 fills with heated water. Once controller assembly 106 determines that the hydronic emitter 101 is filled (at the end of time interval $T_{on}$, for example, when the outlet temperature measured by sensor 104 is sufficiently high), controller assembly 106 causes the valve to close thus stopping the water flow during time interval $T_{off}$. Because water flow is turned on and then turned off during a cycle, water flow is pulsed. After one or more pulsing cycles, controller assembly 106 repeats the above actions based on the updated room temperature obtained from the associated thermostat. Controller assembly 106 modulates the water flow through hydronic emitter 101 until room temperature 151 reaches a targeted heating temperature.

With some embodiments, the maximum floor temperature may be obtained through the associated thermostat or from a wireless device via an app.

Controller assembly 106 may connect to temperature sensor 104 in a number of ways. For example, temperature sensor 104 may be a separate radio frequency module sensor that reports the measured temperatures to controller assembly 106 periodically or by a wired communication.

Figure 2:
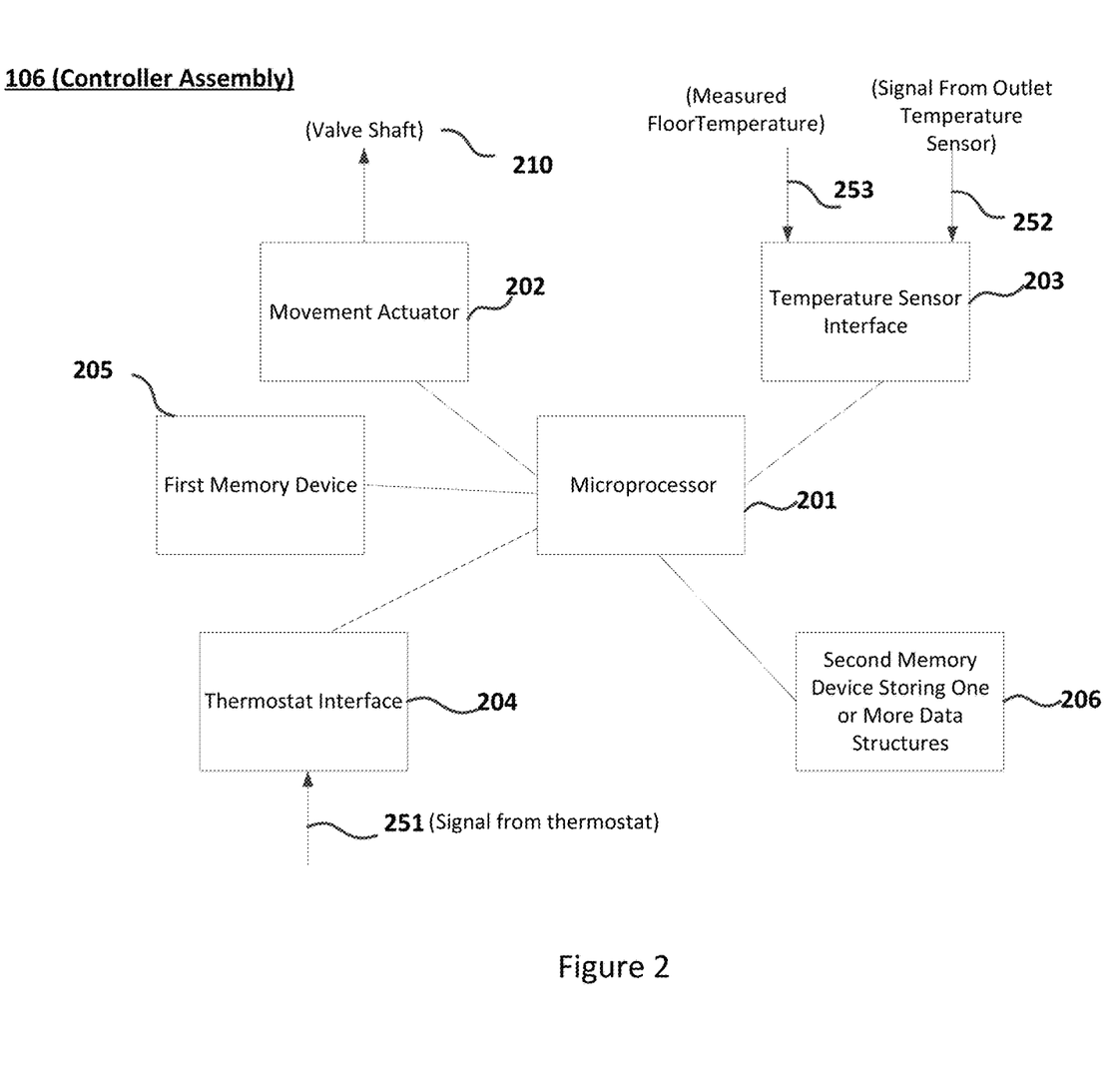
FIG. 2 shows a controller assembly that controls water flow through a hydronic emitter in accordance with an embodiment.

FIG. 2 shows controller assembly 106 that controls water flow through a hydronic emitter in accordance with an embodiment.

Controller assembly 106 obtains thermostat signal 251, which may be indicative of the temperature set point, current room temperature, and/or maximum floor temperature, via thermostat interface 204. With some embodiments, a UFH circuit must not exceed a maximum floor temperature. For example, an excessive floor temperature for a tiled floor of a bathroom may cause the occupant discomfort when bare footed. As another example, an excessive floor temperature may cause physical damage to floor material (for example, wood).

Controller assembly 106 may receive signal 251 through various communication media, including wireless or wired channels using different communication protocols.

Processor 201 processes signal 251 in accordance with computer readable instructions obtained from memory device 205. For example, the computer readable instructions may reflect flowchart 500 and/or flowchart 600 shown in in FIGS. 5 and 6, respectively, as will be discussed. Based on information obtained from signal 251, processor 201 controls water flow though hydronic emitter 101 by controlling a valve through movement actuator 202. For example, movement actuator 202 may comprises a precision motor drive that drives valve shaft 210 as instructed by processor 201.

Processor 201 also obtains measured temperatures measured at outlet 103 via temperature sensor interface 203 from temperature sensor 104. As will be discussed, microprocessor 201 may detect that hydronic emitter 101 has filled with heated water when the temperature at outlet 103 is sufficiently high.

With some embodiments, processor 201 determines a temperature difference between the room temperature and temperature set point extracted from signal 251. Processor 201 turns water flow on and off in a pulsed fashion by appropriating driving valve shaft 210 in order not to exceed a maximum floor temperature as will be discussed in further detail.

With reference to FIG. 2, the computing system environment may include a computing device wherein the processes discussed herein may be implemented. The computing device may have a processor 201 for controlling overall operation of the computing device and its associated components, including RAM, ROM, communications module, and memory devices 205 and 206. The computing device typically includes a variety of computer readable media. Computer readable media may be any available media that may be accessed by computing device and include both volatile and nonvolatile media, removable and non-removable media. By way of example, and not limitation, computer readable media may comprise a combination of computer storage media and communication media.

Computer storage media may include volatile and non-volatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

With some embodiments, memory devices 205 and 206 may be physically implemented with a single memory device.

Traditional approaches often have only a single thermostat and consequently do not support multiple thermostats. With traditional approaches, a boiler provides a single water temperature applicable to the entire building structure.

With an aspect of the embodiments, water flow is controlled separately for different hydronic emitters associated with different portions (for example, rooms) of the building structure (for example, a house) rather than at the boiler itself. Consequently, embodiments may support multiple heating/cooling zones.

Figure 3:
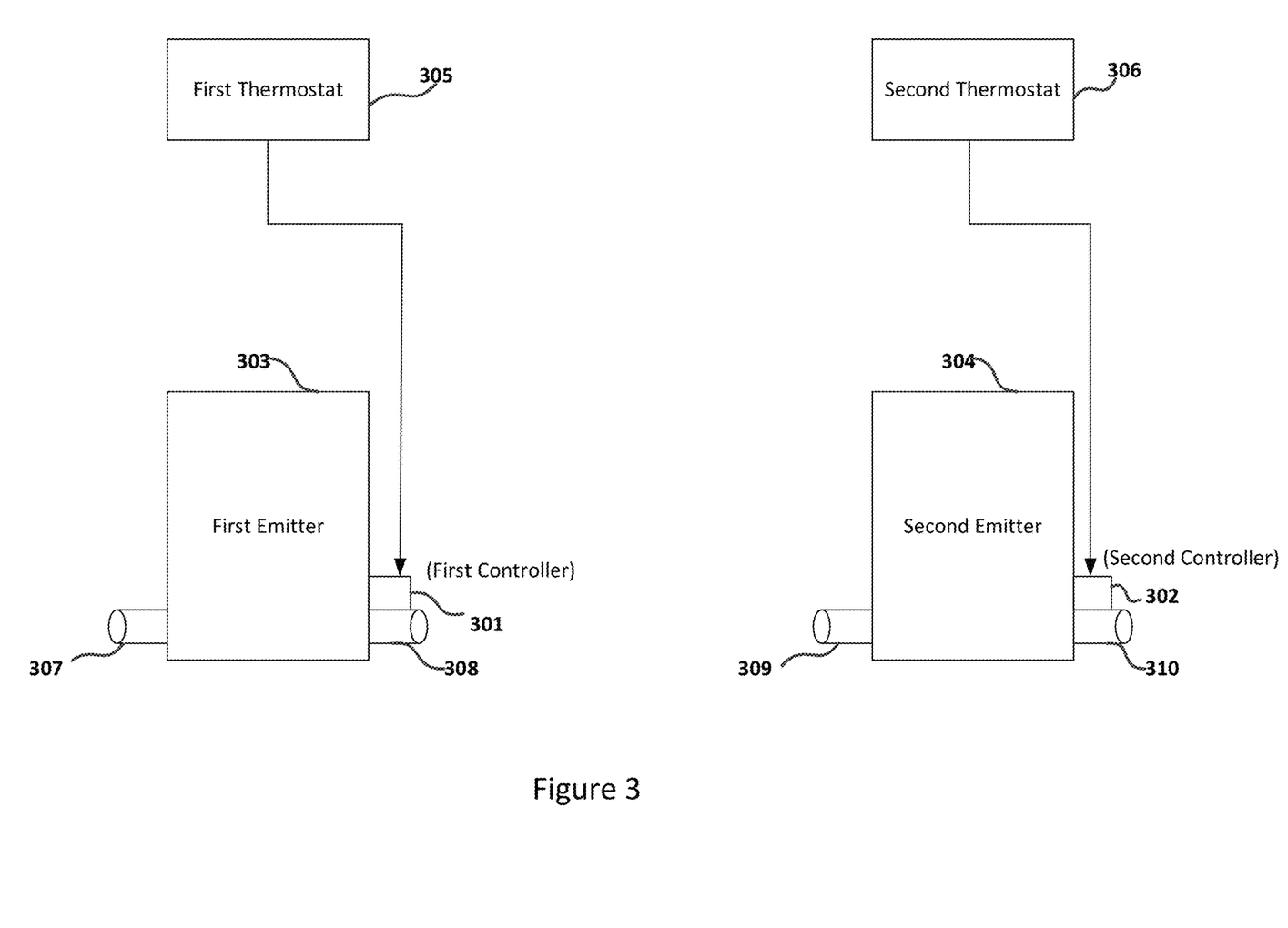
FIG. 3 shows an under-floor heating/cooling manifold with a plurality of emitters in accordance with an embodiment.

FIG. 3 shows an underfloor heating/cooling manifold with a plurality of emitters 303 and 304 in accordance with an embodiment. Controller assemblies 301 and 302 control water flow through emitters 303 and 304, respectively, based on signals obtained from thermostats 305 and 306, respectively. Inlets 307 and 309 may connect to water flow pipe 107 and outlets 308 and 310 may connect to water return pipe 108 as shown in FIG. 1.

Controller assemblies 301 and 302 control water flow through emitters 303 and 304, respectively, based on room temperatures, temperature set points, and maximum floor temperatures provided by thermostats 305 and 306, respectively. Consequently, controller assemblies 301 and 302 may support separate first and second heating/cooling zones, respectively. In accordance with some embodiments, while not explicitly shown, controller assembly 301 is electrically coupled to temperature sensors thermally coupled to outlet 308 while controller assembly 302 is electrically coupled to temperature sensors thermally coupled to outlet 310.

Emitters 303 and 304 may heat or cool different environmental entities (for example, rooms), where thermostats 305 and 306 are located in the corresponding environmental entities.

Figure 4:
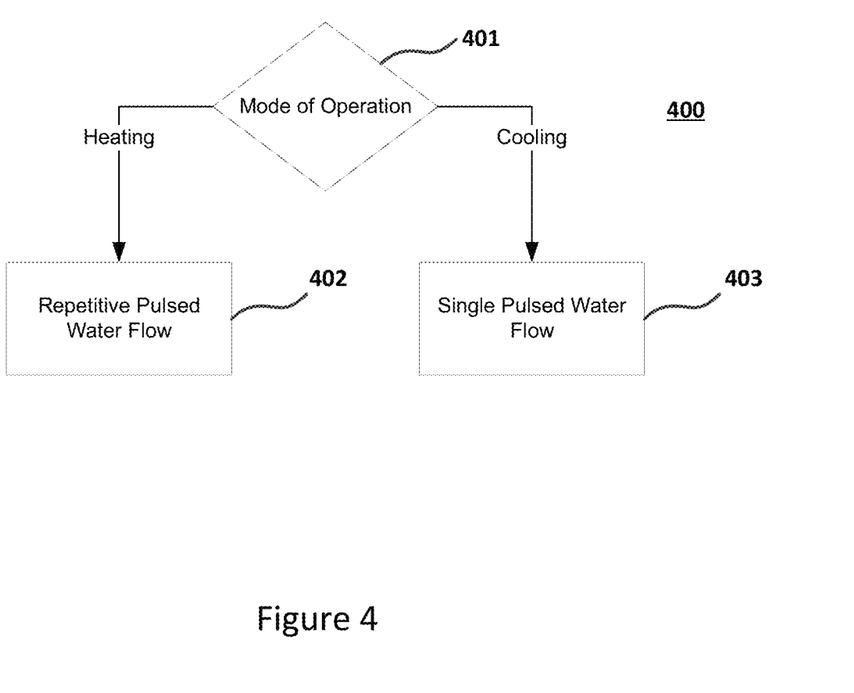
FIG. 4 a flowchart of the operation of a controller assembly in accordance with an embodiment.

FIG. 4 shows flowchart 400 of the operation of controller assembly 106 in accordance with an embodiment. With some embodiments, controller assembly 106 supports both heating and cooling of an environmental entity, where assembly 106 determines the mode at block 401.

At block 402, when in the heating mode controller assembly 106 drives valve shaft 210 so that water flow (heated water) through the emitter is repetitively pulsed in order to prevent the floor temperature from reaching limits of the floor's material or to maintain the comfort level of the occupant. During each pulse, water flow is turned on during time duration $T_{on}$, and turned off during time duration $T_{off}$.

When in the cooling mode at block 403, controller assembly controls valve shaft 210 so that water flow (cooled water) through the emitter continues until a targeted cooling temperature is reached. The operation in the cooling mode may be different from that in the heating mode because cooling temperatures typically do not pose any damage to the floor material. Consequently, water flow may be pulsed in a single pulsing cycle.

Figure 5:
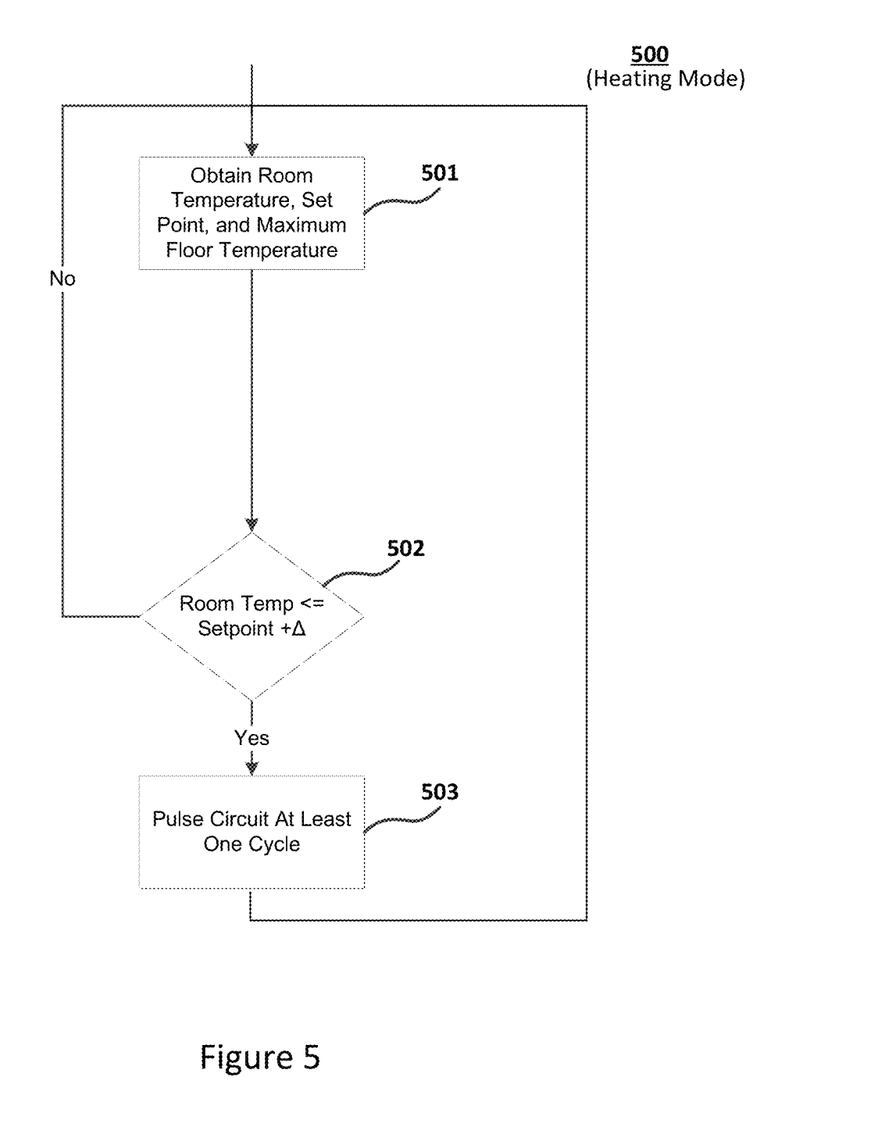
FIG. 5 shows a flowchart of the operation of a controller assembly when in a heating mode in accordance with an embodiment.

FIG. 5 shows flowchart 500 of the operation of controller assembly 106 when in a heating mode in accordance with an embodiment.

With some UFH systems there are two temperatures that need to be controlled. One is the room temperature that is controlled via a room thermostat such that when the desired room temperature is reached that circuit is switched off. Conversely, when the room temperature is below the desired room temperature the circuit is switched on. The other temperature that may be controlled is the floor surface temperature.

With a traditional approach, some UFH room thermostats are fitted with two sensors, one for measuring the room temperature and the other for measuring the surface floor temperature. The floor temperature sensor may be a physical sensor which is connected to the floor surface or an infrared sensor mounted in the room thermostat that measures the floor surface temperature via an infrared sensor scanning the floor surface temperature below the thermostat. The purpose of the floor temperature sensor is to switch off the UFH circuit if the floor temperature is detected to be above the setting and conversely switch the circuit on when the surface temperature falls below the setting. The reason that floor temperature sensing is required, in addition to room temperature sensing, is that some floor surfaces within the home should not be allowed to become too hot, for example rooms that have laminate wooden floors or are installed with tiled floors. This "balance" between floor and room temperature control does present some problems. One deficiency with traditional approaches is that the floor sensing often takes place at the room edge, which is typically not the optimum place to sense the floor temperature. With infrared sensors the problem may be compounded. In addition to being near the room edge, the sensor must be unobscured between the thermostat and the floor surface. Traditionally, the flow temperature to the UFH system manifold is set to as low a flow temperature as possible to ensure floors do not become overheated; however, this approach may require that rooms take much longer than necessary to heat up.

With an aspect of the embodiments, varying the floor surface temperature in individual UFH circuit may result in higher flow temperatures with respect to traditional approaches.

With another aspect of the embodiments, controller assembly 106 provides a modulating control for HVAC emitters by start/stopping the fluid flow over a time cycle.

With another aspect of the embodiments, controller assembly 106 provides a variable floor temperature for underfloor heating by starting/stopping the flow over a duty on/off cycle.

Referring to FIG. 5, at block 501 controller assembly 106 obtains a measured room temperature, temperature set point, and a maximum floor temperature. With some embodiments, these parameters are obtained through a corresponding thermostat. However, with some embodiments, the maximum floor temperature may be obtained through other means such as a mobile device (via an app) or directly programmed at controller assembly 106.

At block 502, controller 106 determines whether the room temperature is below a targeted heating temperature. If so, at least one pulsing pulse is generated at block 503, where water flow in turned on and then off. Pulsing may occur multiple times before controller 106 returns to block 501 to obtain the updated room temperature resulting from the pulsing.

As will be discussed, hydronic emitter (circuit) 101 may completely fill with heated water at the end of $T_{on}$ before being turned off during $T_{off}$. However, with some embodiments hydronic emitter 101 may not completely fill with heated water during $T_{on}$. On the other hand, with some embodiments, hydronic emitter 101 may completely fill somewhere before the expiration of $T_{on}$.

With the some embodiments, the targeted heating temperature is equal to the set point temperature plus a temperature offset Δ. The temperature offset provides a hysteresis that prevents chattering around the temperature set point. Otherwise, when the ON/OFF control turns water flow on and off at the set point, there may be small amounts of noise near the set point, causing the water flow to turn on and off frequently.

Figure 6:
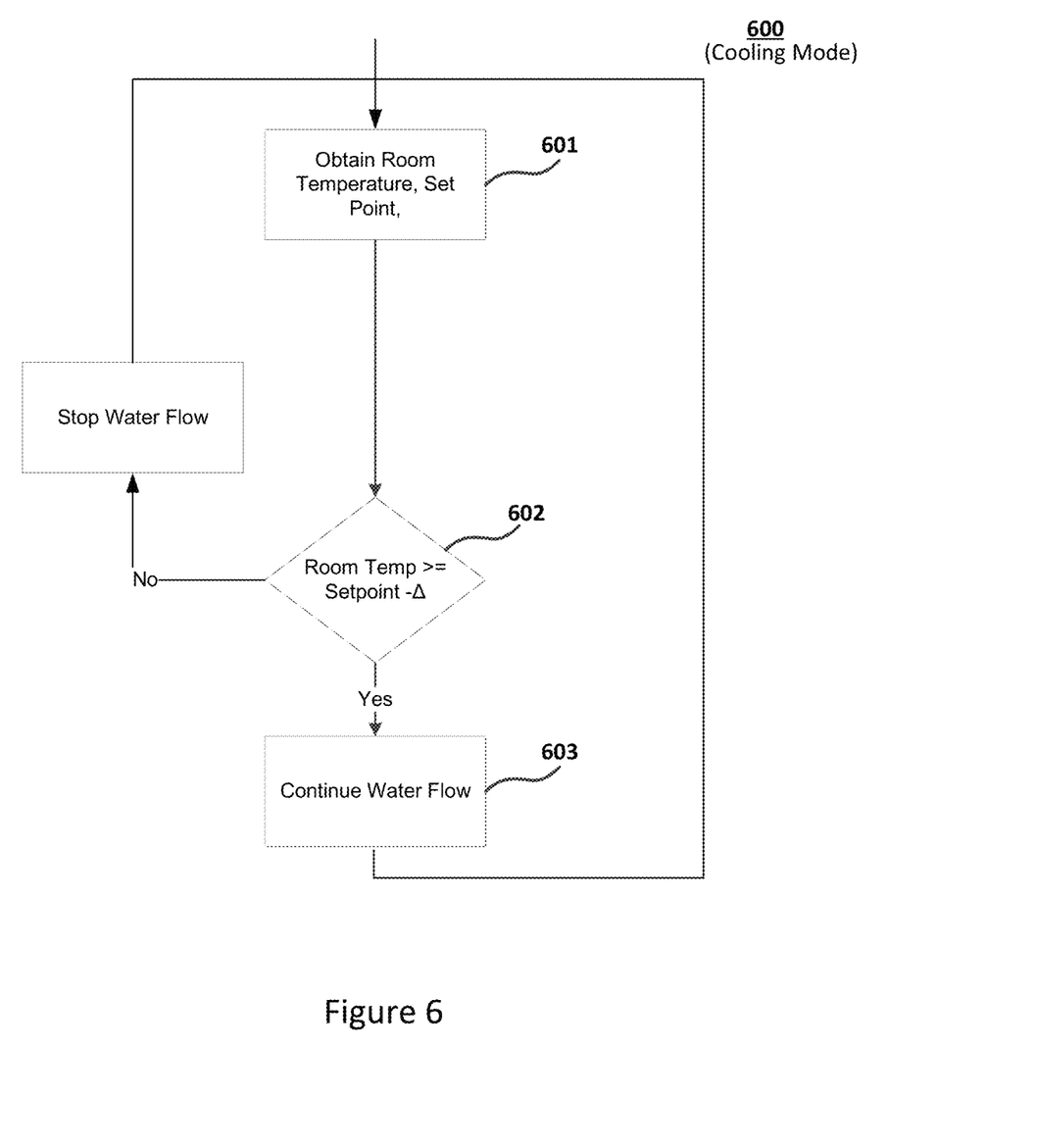
FIG. 6 shows a flowchart of the operation of a controller assembly when in a cooling mode in accordance with an embodiment.

FIG. 6 shows flowchart 600 of the operation of a controller assembly for a cooling mode in accordance with an embodiment.

At block 601, controller assembly 106 obtains a room temperature and temperature set point from the associated thermostat. At block 602, if the room temperature as measured at the thermostat is above a targeted cooling temperature, controller assembly 106 allows cooled water to flow through hydronic emitter 101. However, if the measured room temperature is below the targeted cooling temperature, the water flow is stopped at block 603.

While the floor temperature is typically not an issue to floor damage when cooling, the floor temperature may be uncomfortable to the occupant when the floor temperature is below a minimum floor temperature. If that is the case, controller assembly 106 may repetitively pulse water flow in a similar manner as when in the heating mode. However, the pulsing may be based on a cooling ratio $T_{cooling\_on}/T_{cooling\_off}$.

With some embodiments, water flow may be at a constant rate at block 603, either with the valve fully or partially open.

With some embodiments, water flow may vary. For example, at block 603 water flow may be reduced as the room temperature approaches the targeted cooling temperature.

Figure 7:
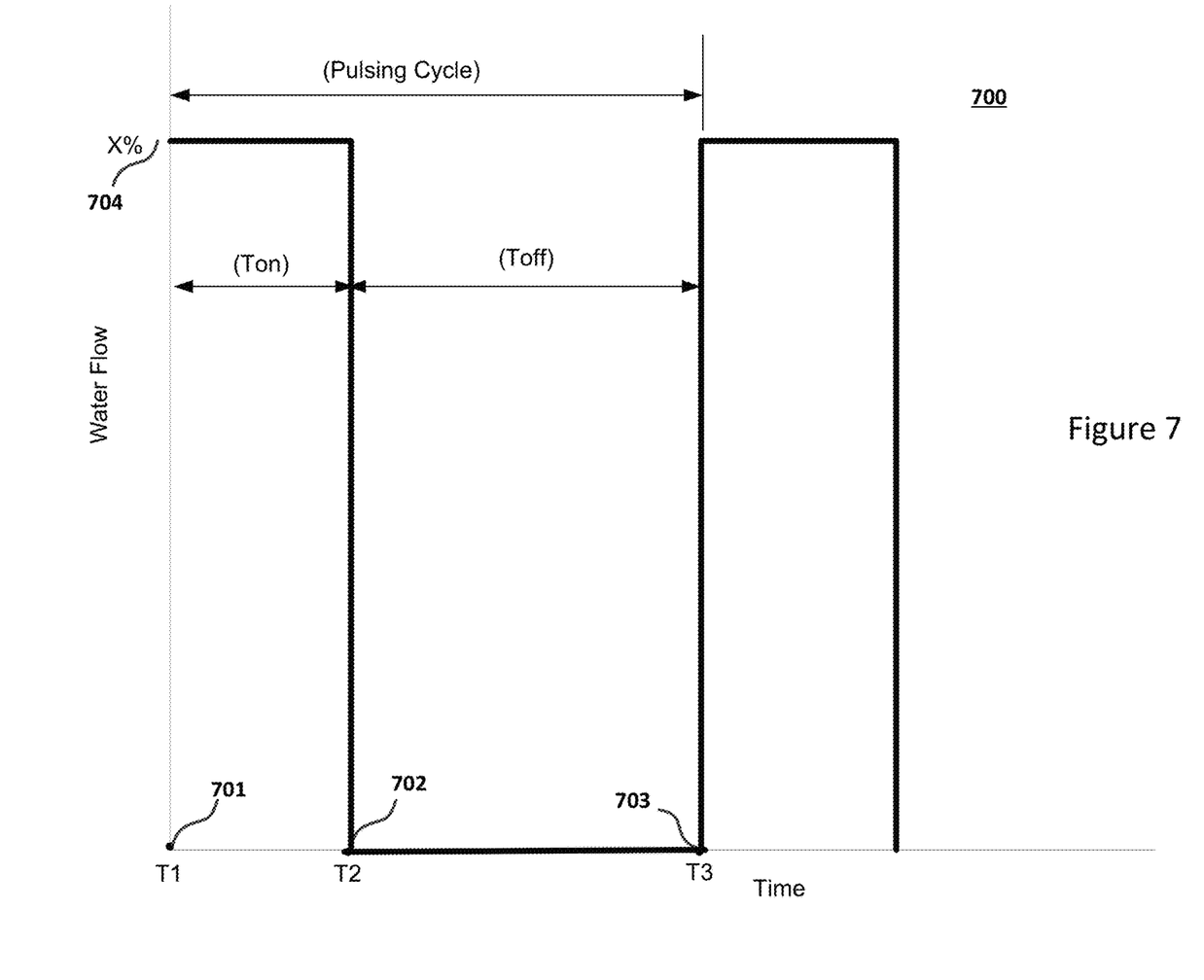
FIG. 7 shows an example of an amount of water flow through an emitter over a pulsing cycle in accordance with an embodiment.

FIG. 7 shows example 700 of an amount of water flow through hydronic emitter 101 over a pulsing cycle in accordance with an embodiment. During a pulsing cycle, controller assembly 106 allows water flow from T1 701 to T2 702 ($T_{on}$) and stops water flow from T2 702 to T3 703 ($T_{off}$). In the example, the ratio $T_{on}/T_{off}$ is approximately ½, where the corresponding duty cycle $T_{on}/(T_{on}+T_{off})$ is approximately ⅓.

During $T_{on}$, hydronic emitter 101 fills with heated water (with a water volume approximately equal to X % of full rate times $T_{on}$). This replaced amount of heated water may completely fill emitter 101. However, with some embodiments, this amount may partially fill emitter 101. During $T_{off}$, the heated water with in emitter 101 is allowed to transfer heat to the environmental entity before refilling during the next pulsing cycle.

Example 700 shows a constant water flow (X % of full rate) during $T_{on}$. However, water flow may vary during $T_{on}$ by control assembly 106 changing the position of the valve during $T_{on}$.

As will be discussed, the pulsing cycle may be selected to that the resulting floor temperature does not exceed a maximum floor temperature that may damage the floor material of may be uncomfortable to an occupant when walking on the floor.

Figure 8:
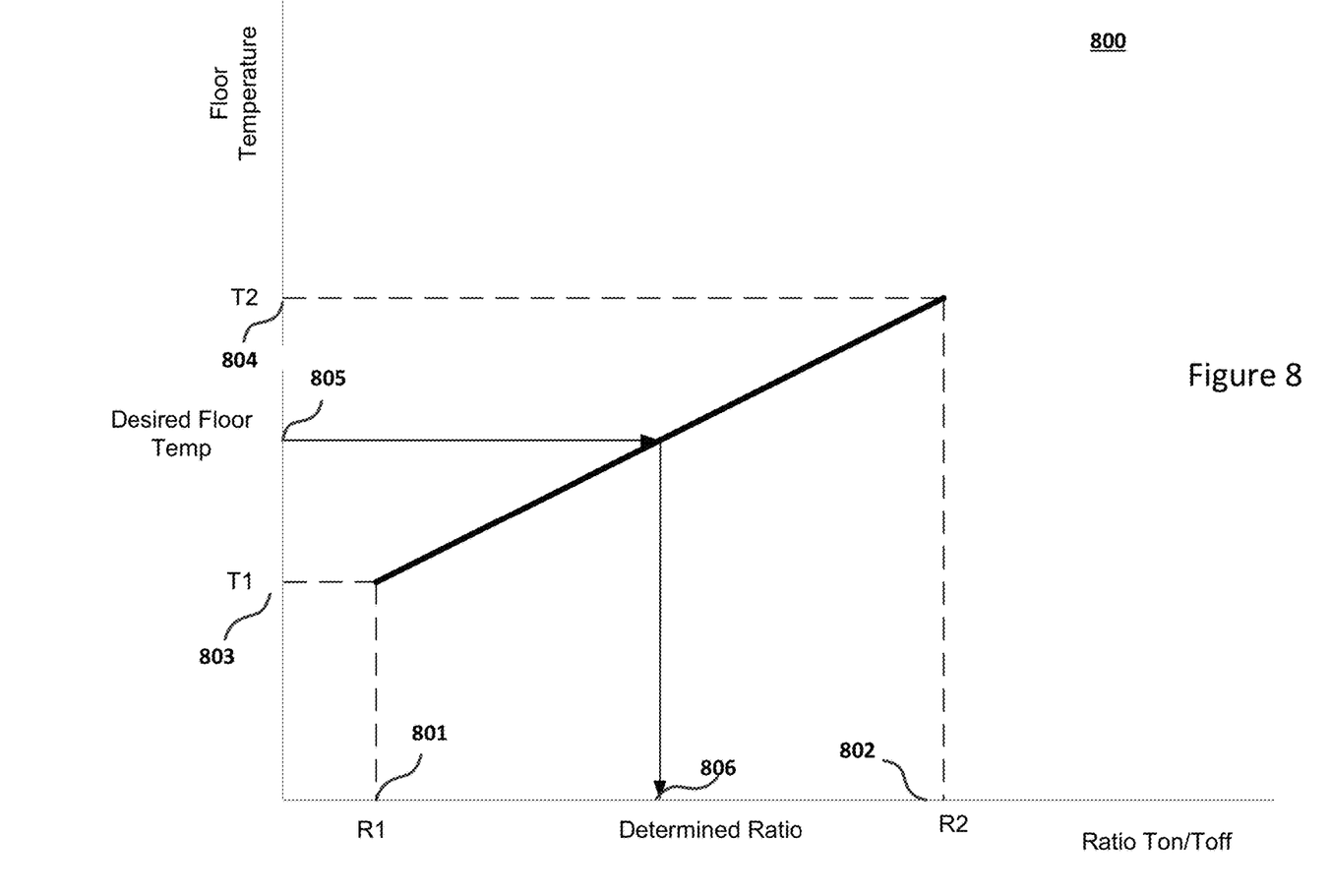
FIG. 8 shows an exemplary relationship between floor temperature and a ratio $T_{on}/T_{off}$ flowchart in accordance with an embodiment.

FIG. 8 shows exemplary relationship 800 between floor temperature and a ratio $T_{on}/T_{off}$ flowchart in accordance with an embodiment. During $T_{on}$ controller assembly 106 fills hydronic emitter 101 with hot water and stops the water flow during $T_{off}$. As ratio $T_{on}/T_{off}$ increases, the resulting floor temperature increases in a linear fashion (where floor temperatures T1 803 and T2 804 correspond to ratios R1 801 and R2 802, respectively) although some embodiments may exhibit a non-linear relationship.

Figure 10:
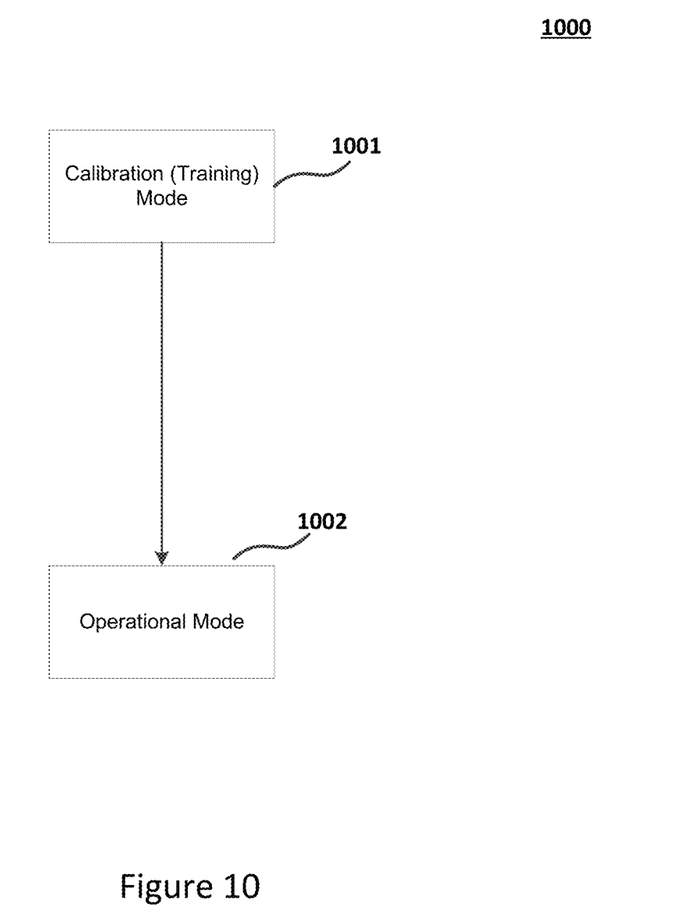
FIG. 10 shows a flowchart of the operation of a controller assembly in accordance with an embodiment.

Relationship 800 may be determined by empirical or analytical means. For example, as will be discussed, a relationship between ratio $T_{on}/T_{off}$ and the floor temperature may be empirically obtained from calibration mode 1001 (as shown in FIG. 10).

Figure 9:
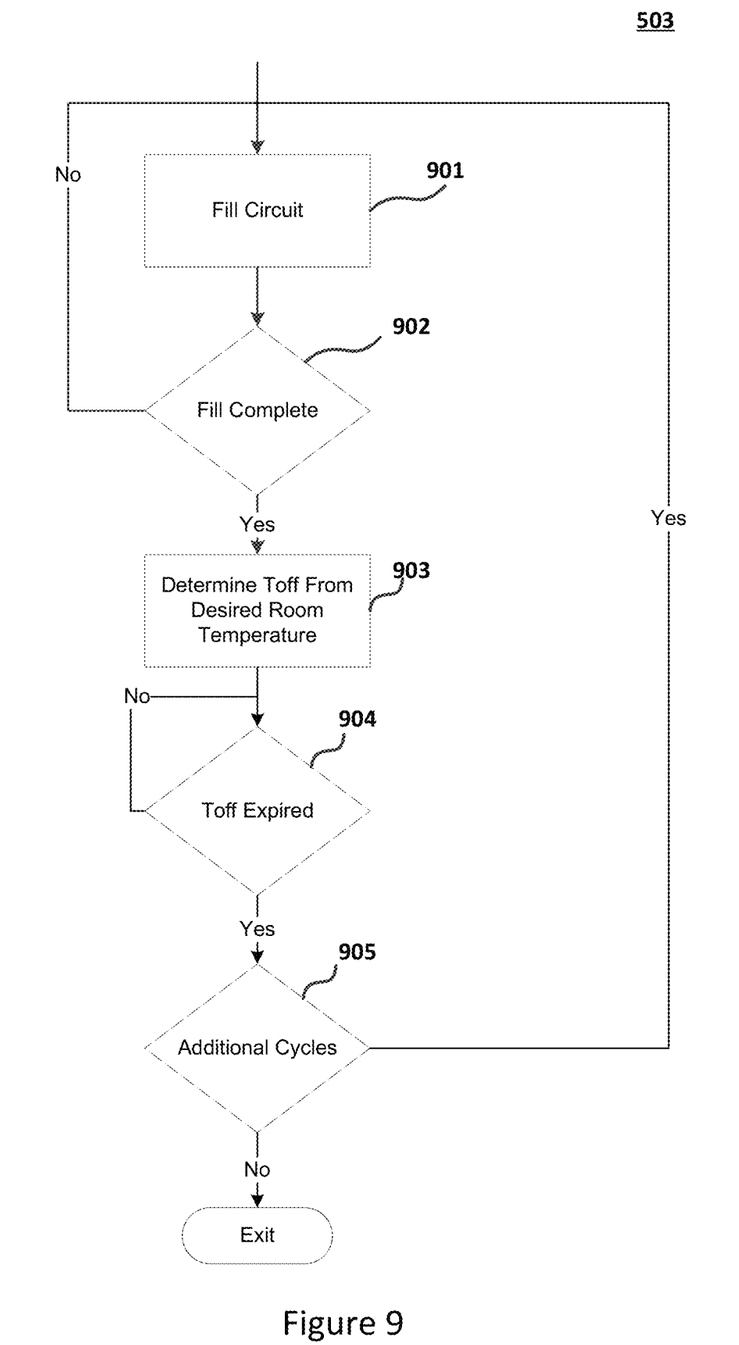
FIG. 9 shows a flowchart for pulsing water flow through a hydronic emitter in accordance with an embodiment.

FIG. 9 shows flowchart 503 (corresponding to block 503 as shown in FIG. 5) for pulsing water flow through a hydronic emitter in accordance with an embodiment.

With an aspect of the embodiments, a UFH system may support a higher flow temperature than traditional approaches, thus decreasing the time taken for a room to reach the correct room temperature while preventing some room floor surfaces from becoming too hot. Rather than allowing a constant flow of water through each UFH circuit, as occurs in traditional designs, the circuits that require a lower floor surface temperatures are allowed to completely fill with hot water. The flow is then shut off for a predetermined period of time.

Referring to FIG. 9, at block 901 controller assembly 106 fills emitter 101 (circuit) with hot water during $T_{on}$. Controller assembly 106 detects whether the circuit has completely filled at block 902 when outlet temperature at outlet 103 (as provided by sensor 104) has risen. If not, the circuit continues filling at block 901.

At block 903, controller assembly 106 determines $T_{off}$ from the ratio corresponding to the maximum floor temperature of the floor material. For example, referring to FIG. 8, one may use relationship 800 to change the floor temperature to desired floor temperature 805 because of comfort level or possible damage to the floor. The corresponding ratio 806 can be obtained by mapping desired floor temperature 805 to determined ratio 806.

If the circuit is filled, controller assembly 106 quickly turns off the water flow at block 904. (Consequently, slow-acting actuators may require as much as three minutes to open or close and may be unsuitable with this approach.) The water flow remains off for $T_{off}$, which may be obtained from the ratio $T_{on}/T_{off}$ corresponding to the desired maximum floor temperature as determined at block 903.

Controller assembly 106 may complete a number of pulsing cycles (one or more) before obtaining an updated room temperature at block 501 (as shown in FIG. 5).

FIG. 10 shows flowchart 1000 of the operation of controller assembly 106 in accordance with an embodiment. There are two modes of operation: calibration (training mode) at block 1001 and operational mode at block 1002.

At block 1001, as will be discussed in further detail, controller assembly 106 determines a pulsing ratio corresponding to the maximum floor temperature of the room's floor. Controller assembly then uses the determined ratio when operating in the operational mode at block 1002 as previously discussed with FIGS. 4-6 and 9.

Figure 11:
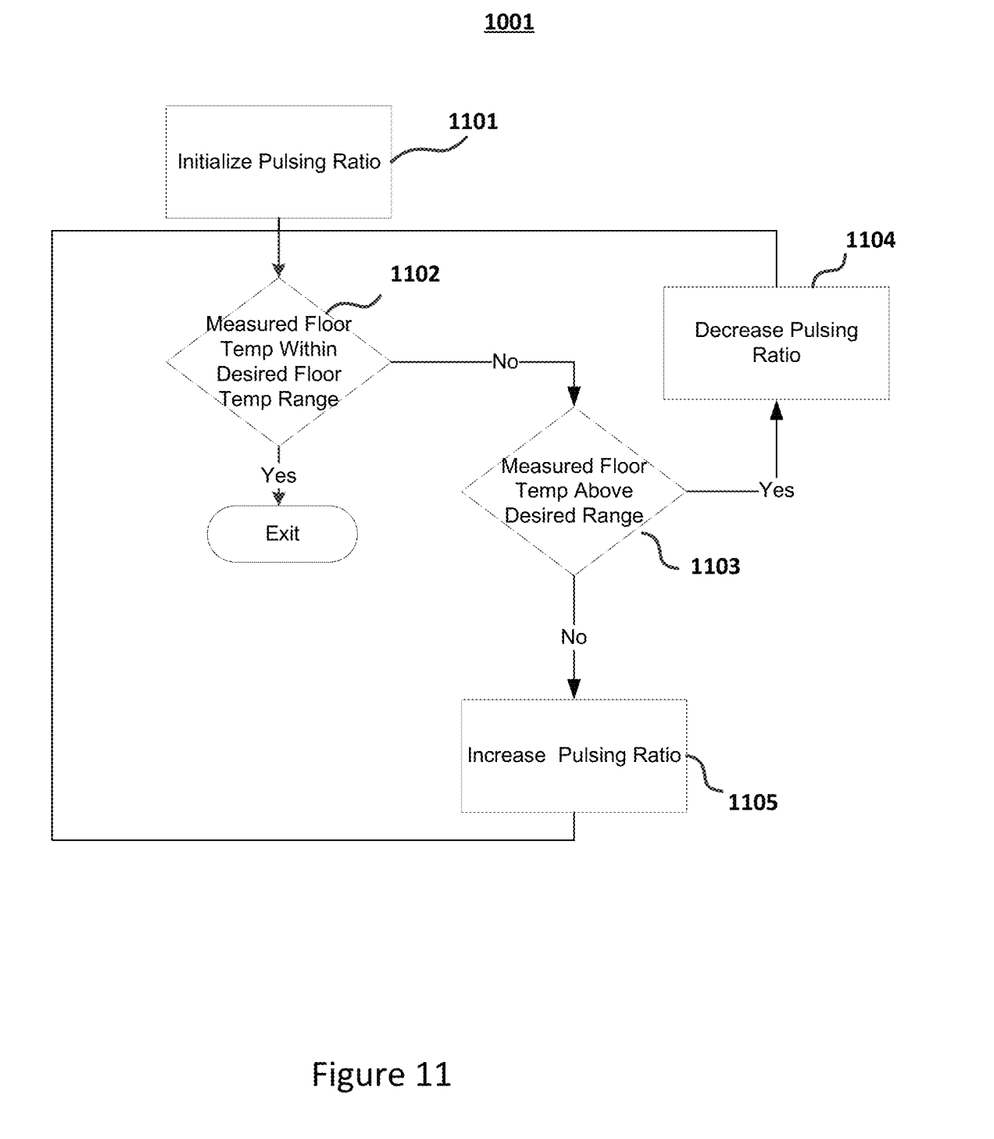
FIG. 11 shows a flowchart of operation of a controller assembly during a calibration mode in accordance with an embodiment.

FIG. 11 shows flowchart 1100 of operation of controller assembly 106 during a calibration mode in accordance with an embodiment. The calibration mode is typically performed when a UFH system is being installed. Once the desired pulsing ratio is determined for the installed UFH system, the system goes into the operational mode using the determined pulsing ratio to limit floor temperature not to exceed the maximum floor temperature.

During the calibration mode, the floor temperature may be measured by a thermometer temporarily placed on an appropriate floor location (for example, the middle of the floor) to obtain a representative measurement of the floor. The thermometer may communicate with controller assembly 106 through different communication means (including wireless or wired means) or may communicate with controller assembly 106 via an associated thermostat (for example, thermostat 305 as shown in FIG. 3). Once the calibration process 1100 has been completed, the thermometer may be removed and controller assembly 106 may transition the operational mode.

Referring to FIG. 11, at block 1101, controller assembly 106 initializes the pulsing ratio to a starting value. For example, the ratio may be initialized to a small value so that the resulting floor temperature does not damage the floor. In subsequent blocks 1102-1105, controller assembly 106 either increases or decreases the ratio by an incremental amount so that the resulting floor temperature is within a desired floor temperature range.

Based on calibration process 1100, controller assembly 106 obtains an appropriate ratio value that can be used during the operational mode in order to keep the floor temperature from reaching the maximum floor temperature. However, with some embodiments, controller assembly 106 may construct a floor temperature-pulsing ratio relationship (for example, relationship 800 as shown in FIG. 8) so that the resulting floor temperature may be changed during the operational mode, for example, via the associated thermostat.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

What is claimed is:

1. An underfloor heating (UFH) system comprising:
at least one controller assembly controlling the system, the at least one controller assembly including:
a movement actuator configured to connect to a valve in order to control water flow through a hydronic emitter;
a temperature sensor interface configured to interface to a temperature sensor, wherein the temperature sensor measures an outlet temperature of the hydronic emitter;
a thermostat interface configured to obtain a measured room temperature for an environmental entity, wherein the environmental entity comprises a floor; and
a computer device comprising:
a processor; and
a first memory device storing computer-readable instructions that, when executed by the processor, cause the at least one controller assembly to perform:
obtaining, through the thermostat interface, the measured room temperature;
determining a pulsing ratio $T_{on}/T_{off}$ based on a maximum floor temperature of the floor, wherein the movement actuator enables the water flow through the valve during $T_{on}$ and stops the water flow during $T_{off}$;
when the measured room temperature has not reached a targeted temperature, instructing the movement actuator to pulse the water flow through the hydronic emitter in accordance with the determined pulsing ratio;
repeating the obtaining and the instructing for an updated room temperature; and
when the outlet temperature is above a predetermined temperature, stopping the water flow through the hydronic emitter during $T_{off}$.

2. The UFH system of claim 1, wherein the hydronic emitter fills with heated water during $T_{on}$.

3. The UFH system of claim 1, wherein the first memory device stores computer-readable instructions that, when executed by the processor, cause the at least one controller assembly to perform:
determining that the hydronic emitter has filled when the outlet temperature reaches a predetermined temperature value.

4. The UFH system of claim 1, wherein the first memory device stores computer-readable instructions that, when executed by the processor, cause the at least one controller assembly to perform:
instructing the movement actuator to pulse the water flow over a number of pulsing cycles in accordance with the determined pulsing ratio before obtaining the updated room temperature.

5. The UFH system of claim 4, wherein the first memory device stores computer-readable instructions that, when executed by the processor, cause the at least one controller assembly to perform:
determining the number of pulsing cycles.

6. The UFH system of claim 1, wherein the targeted temperature is approximately a set point plus an offset.

7. The UFH system of claim 1, wherein the determining the pulsing ratio further comprises:
obtaining a measured floor temperature; and
adjusting the pulsing ratio until the measured floor temperature is within a maximum floor temperature range.

8. The UFH system of claim 7, wherein the adjusting the pulsing ratio further comprises:
when the measured floor temperature is above a predetermined value, decreasing the pulsing ratio.

9. The UFH system of claim 1 further comprising a second memory device, wherein the first memory device stores computer-readable instructions that, when executed by the processor, cause the at least one controller assembly to perform:
accessing the pulsing ratio from the second memory device based on the maximum floor temperature.

10. The UFH system of claim 1 further comprising a first and a second controller assembly, wherein:
the first controller assembly controls water flow through a first hydronic emitter based on a first room temperature and a first maximum floor temperature of a first environmental entity; and the second controller assembly controls water flow through a second hydronic emitter based on a second room temperature and a second maximum floor temperature of a second environmental entity.

11. A manifold/valve heating/cooling system comprising:
at least one controller assembly controlling the system, the at least one controller assembly including:
  a movement actuator configured to connect to a valve in order to control water flow through a hydronic emitter;
  a temperature sensor interface configured to interface to a temperature sensor, wherein the temperature sensor measures an outlet temperature of the hydronic emitter;
  a thermostat interface configured to obtain a measured room temperature for an environmental entity, wherein the environmental entity comprises a floor; and
  a computer device comprising:
  a processor; and
  a first memory device storing computer-readable instructions that, when executed by the processor, cause the at least one controller assembly to perform:
    obtaining, through the thermostat interface, the measured room temperature; when the manifold/valve heating/cooling system is operating in a heating mode:
      determining a pulsing ratio $T_{on}/T_{off}$ based on a maximum floor temperature of the floor, wherein the movement actuator enables the water flow through the valve during $T_{on}$ to fill the hydronic emitter with heated water and stops the water flow through the hydronic emitter during $T_{off}$;
      when the measured room temperature has not reached a targeted heating temperature, instructing the movement actuator to pulse the water flow through the hydronic emitter in accordance with the determined pulsing ratio over a number of pulsing cycles;
      repeating the obtaining and the instructing for an updated room temperature; and
      varying the number of pulsing cycles as the measured room temperature approaches the targeted heating temperature; and
    when the manifold/valve heating/cooling system is operating in a cooling mode:
      instructing the movement actuator to allow the water flow until a targeted cooling temperature is reached.

12. The manifold/valve heating/cooling system of claim 11, wherein the first memory device stores computer-readable instructions that, when executed by the processor, cause the at least one controller assembly to perform:
  when in the cooling mode, reducing the water flow as the measured room temperature approaches the targeted cooling temperature.

13. A method for controlling water flowing through a hydronic emitter of a heating/cooling system for an environmental entity having a floor, the method comprising:
  obtaining a measured room temperature of the environmental entity; and
  when operating in a heating mode:
    determining a pulsing ratio $T_{on}/T_{off}$ based on a maximum floor temperature of the floor, wherein a movement actuator enables a water flow through a valve during $T_{on}$ to fill the hydronic emitter with heated water and stops the water flow through the hydronic emitter during $T_{off}$;
    when the measured room temperature has not reached a targeted heating temperature, instructing the movement actuator to pulse the water flow through the hydronic emitter in accordance with the determined pulsing ratio over a number of pulsing cycles;
    repeating the obtaining and the instructing for an updated room temperature; and
    varying the number of pulsing cycles as the measured room temperature approaches the targeted heating temperature.

14. The method of claim 13 further comprising:
obtaining a measured floor temperature; and
adjusting the pulsing ratio until the measured floor temperature is within a maximum floor temperature range.

15. The method of claim 13 further comprising:
when operating in a cooling mode:
  instructing the movement actuator to allow the water flow until a targeted cooling temperature is reached.

16. The method of claim 15 further comprising:
reducing the water flow as the measured room temperature approaches the targeted cooling temperature.

17. The method of claim 13 further comprising:
when operating in a cooling mode:
  determining a cooling pulsing ratio $T_{cooling\_on}/T_{cooling\_off}$ based on a minimum floor temperature of the floor, wherein the movement actuator enables a water flow through the valve during $T_{cooling\_on}$ to fill the hydronic emitter with cooled water and stops the water flow through the hydronic emitter during $T_{cooling\_off}$;
  when the measured room temperature has not reached a targeted cooling temperature, instructing the movement actuator to pulse the water flow through the hydronic emitter in accordance with the determined cooling pulsing ratio over a number of pulsing cycles; and
  repeating the obtaining and the instructing for an updated room temperature.

18. A method for controlling water flowing through a hydronic emitter of a heating/cooling system for an environmental entity having a floor, the method comprising:
  obtaining a measured room temperature of the environmental entity; and
  when operating in a heating mode:
    determining a pulsing ratio $T_{on}/T_{off}$ based on a maximum floor temperature of the floor, wherein a movement actuator enables a water flow through a valve during $T_{on}$ to fill the hydronic emitter with heated water and stops the water flow through the hydronic emitter during $T_{off}$;
    when the measured room temperature has not reached a targeted heating temperature, instructing the movement actuator to pulse the water flow through the hydronic emitter in accordance with the determined pulsing ratio over a number of pulsing cycles;
    repeating the obtaining and the instructing for an updated room temperature;
    obtaining an outlet temperature of the hydronic emitter; and
    when the outlet temperature is above a predetermined temperature, stopping the water flow through the hydronic emitter during $T_{off}$.

19. A non-transitory computer-readable medium storing computer-executable instructions that, when executed by a processor, cause an apparatus to perform:

obtaining a measured room temperature of an environmental entity, the environmental entity comprising a floor;

when operating in a heating mode:

determining a pulsing ratio $T_{on}/T_{off}$ based on a maximum floor temperature of the floor, wherein a movement actuator enables a water flow through a valve during $T_{on}$ to fill a hydronic emitter with heated water and stops the water flow through the hydronic emitter during $T_{off}$;

when the measured room temperature has not reached a targeted heating temperature, instructing the movement actuator to pulse the water flow through the hydronic emitter in accordance with the determined pulsing ratio over a number of pulsing cycles; and repeating the obtaining and the instructing for an updated room temperature; and varying the number of pulsing cycles as the measured room temperature approaches the targeted heating temperature; and when operating in a cooling mode:

instructing the movement actuator to allow the water flow until a targeted cooling temperature is reached based.

* * * * *

UNITED STATES PATENT AND TRADEMARK OFFICE
CERTIFICATE OF CORRECTION

PATENT NO. : 10,712,021 B2
APPLICATION NO. : 16/020180
DATED : July 14, 2020
INVENTOR(S) : Smith It is certified that error appears in the above-identified patent and that said Letters Patent is hereby corrected as shown below:

On the Title Page

Column 1, (71) Applicant, Line 1:
Delete "Computime," and insert --Computime--

In the Drawings

Sheet 7 of 11, Fig. 7:
Delete "(Ton)" and insert --($T_{on}$)-- (as shown on the attached drawing sheet)

Sheet 7 of 11, Fig. 7:
Delete "(Toff)" and insert --($T_{off}$)-- (as shown on the attached drawing sheet)

Sheet 8 of 11, Fig. 8:
Delete "Ton/Toff" and insert --$T_{on}$/$T_{off}$-- (as shown on the attached drawing sheet)

Sheet 9 of 11, Fig. 9, Reference Numeral 903, Line 1:
Delete "Toff" and insert --$T_{off}$-- (as shown on the attached drawing sheet)

Sheet 9 of 11, Fig. 9, Reference Numeral 904, Line 1:
Delete "Toff" and insert --$T_{off}$-- (as shown on the attached drawing sheet)

In the Specification

Column 4, Detailed Description, Line 28:
Delete "in in" and insert --in--

Column 7, Detailed Description, Line 25:
Delete "frequently," and insert --frequently.--

Signed and Sealed this
Twentieth Day of September, 2022

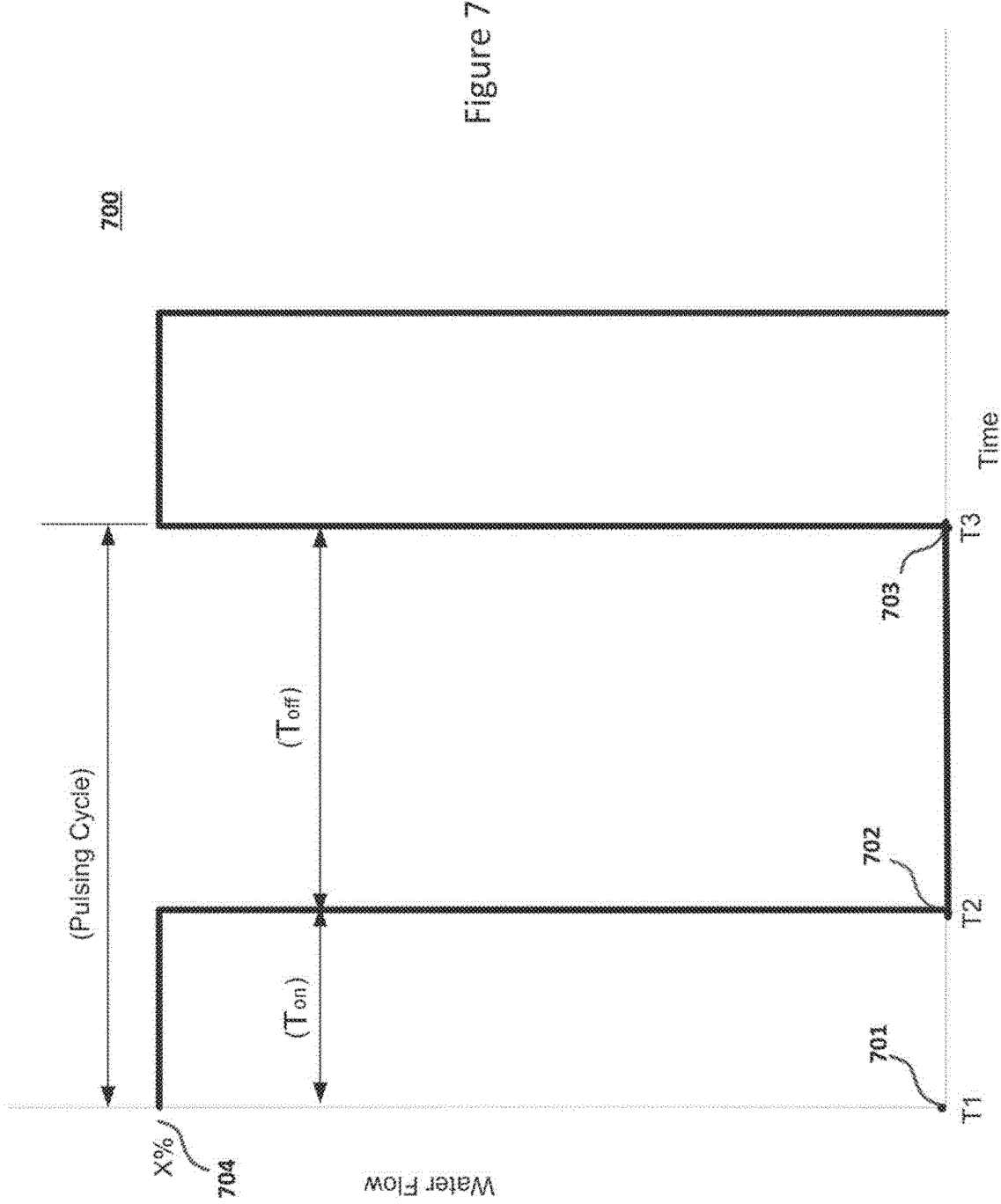

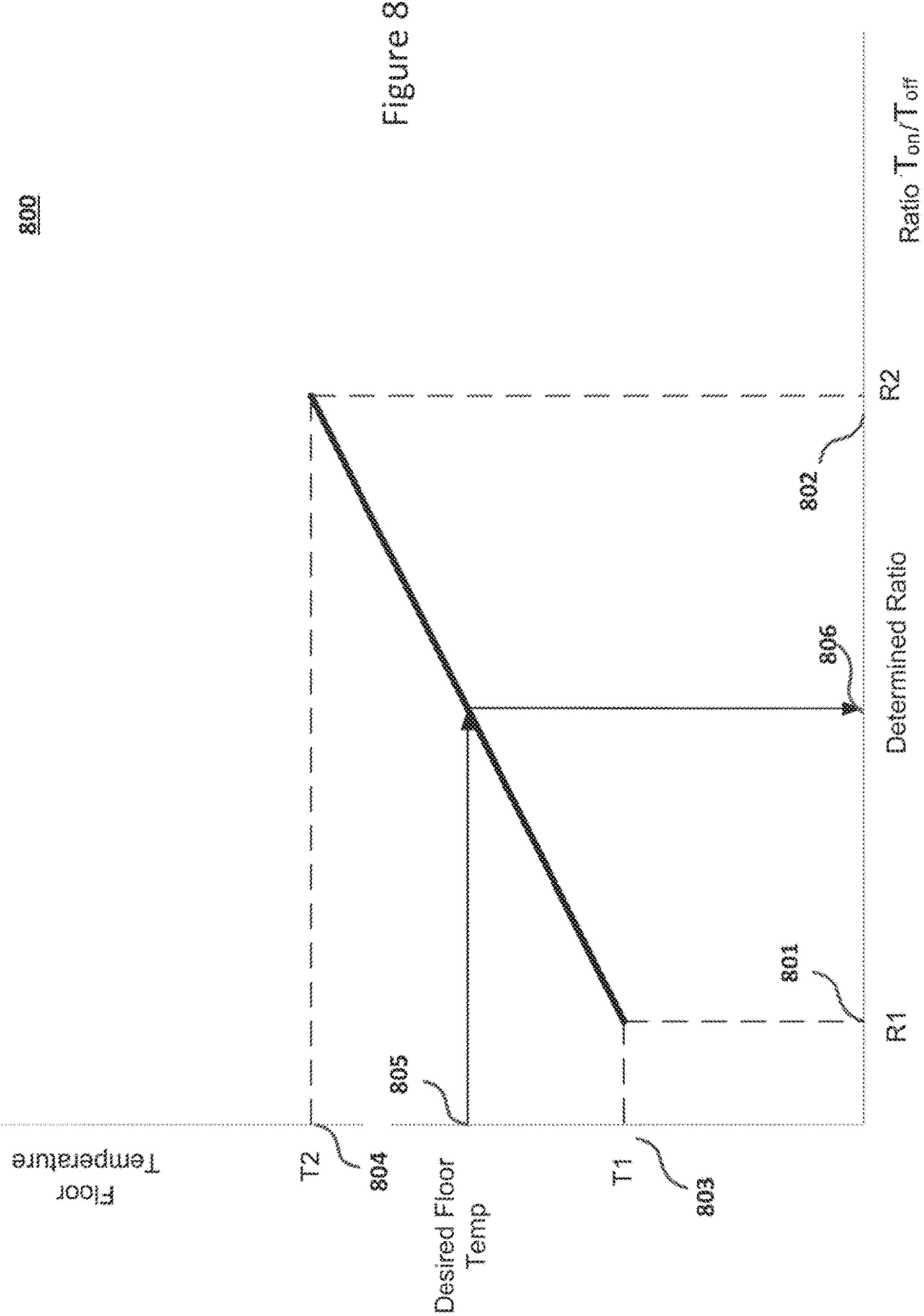

Katherine Kelly Vidal
*Director of the United States Patent and Trademark Office*